(12) United States Patent
Hausknecht

(10) Patent No.: US 6,863,049 B1
(45) Date of Patent: Mar. 8, 2005

(54) AUXILIARY VALVE FOR THE INTAKE PASSAGEWAY OF AN INTERNAL COMBUSTION ENGINE

(76) Inventor: Louis A. Hausknecht, 1011 Sundance Dr., Miamisburg, OH (US) 45342

( * ) Notice: Subject to any disclaimer, the term of this patent is extended or adjusted under 35 U.S.C. 154(b) by 0 days.

(21) Appl. No.: 10/774,206

(22) Filed: Feb. 9, 2004

(51) Int. Cl.[7] ................................................. F02D 9/10
(52) U.S. Cl. ...................... 123/337; 123/336; 123/306; 123/188.7
(58) Field of Search .............................. 123/188.7, 306, 123/457, 336, 337

(56) References Cited

U.S. PATENT DOCUMENTS

| | | | | |
|---|---|---|---|---|
| 3,972,314 A | * | 8/1976 | Dupont et al. ............... | 123/452 |
| 4,058,100 A | * | 11/1977 | Tanaka et al. ............... | 123/457 |
| 4,320,725 A | * | 3/1982 | Rychlik et al. ......... | 123/188.14 |
| 4,858,567 A | * | 8/1989 | Knapp .................... | 123/184.56 |
| 6,332,442 B1 | * | 12/2001 | Komada et al. ........ | 123/184.55 |

* cited by examiner

Primary Examiner—Henry C. Yuen
Assistant Examiner—Arnold Castro
(74) Attorney, Agent, or Firm—Renner, Kenner, Greive, Bobak, Taylor & Weber

(57) ABSTRACT

An auxiliary valve positioned in an intake passageway of a four-cycle internal combustion engine for controlling the flow of air/fuel mixture into a combustion chamber includes a through passage, the through passage defined by a top wall, a bottom wall, and opposing side walls; a swingable door openable and closable in relation to the through passage; and a spring loaded assembly biasing the swingable door closed.

13 Claims, 3 Drawing Sheets

AUXILIARY VALVE FOR THE INTAKE PASSAGEWAY OF AN INTERNAL COMBUSTION ENGINE

TECHNICAL FIELD

This invention relates to internal combustion engines, and the use of an auxiliary valve to increase the efficiency thereof.

BACKGROUND

Internal combustion engines operate according to a combustion cycle having four strokes of operation: intake, compression, combustion, and exhaust. In association with the intake stroke, an intake valve is timed to open and close, in synchronization with a piston. For example, during the intake stroke, the piston is configured to move from top dead center to bottom dead center within the cylinder. Furthermore, during the intake stroke, the intake valve opens and closes according to the movement of the piston to allow the air/fuel mixture from the intake passage to be drawn through the intake port and into the combustion chamber.

If the internal combustion engine is operating at low speeds, the intake valve would ideally be opened when the piston is at top dead center and closed when the piston is at the bottom dead center. However, for the internal combustion engine to operate at high speeds, the valve timing must be changed to allow a maximum amount of air/fuel mixture from the intake passage to enter the combustion chamber. To that end, the intake valve must be opened before the piston reaches top dead center and closed after the piston reaches bottom dead center. At high speeds, the earlier opening and later closing of the intake valve insures that a maximum amount of air/fuel mixture enters the combustion chamber.

To illustrate, when the intake valve is opened before the piston reaches top dead center, the intake valve and the exhaust valve are simultaneously in the open position. At high speeds, such "overlap," created after the intake valve is initially opened and before the exhaust valve is finally closed, allows the exhaust gases exiting via the exhaust valve to act as a "siphon," and draw the air/fuel mixture into the combustion chamber from the intake passage. Most importantly, the overlap also allows the air/fuel mixture remaining in the intake passage to accelerate up to speed before the piston begins the intake stroke.

In practice, if the internal combustion engine is operating at high speeds, and the intake valve is instead timed to open when the piston reaches top dead center, then a significantly smaller amount of fuel/air mixture could be drawn into the combustion chamber. For example, regardless of the position of the piston, the intake passage is charged with a static amount of air/fuel mixture before the intake valve is opened. However, when the internal combustion engine is operating at high speeds, the air/fuel mixture has a limited time to enter the combustion chamber during the intake stroke. Therefore, the air/fuel mixture must have sufficient speed to pass through the intake port and enter the combustion chamber before the piston begins the intake stroke. The earlier opening of the intake valve allows the air/fuel mixture to accelerate up to speed, thereby allowing an increased amount of air/fuel mixture to enter the combustion chamber when the internal combustion engine is operating at high speeds.

Furthermore, when the internal combustion engine is operating at high speeds, the later closing of the intake valve also allows an increased amount of air/fuel mixture to enter the combustion chamber. As discussed hereinabove, during the intake stroke, the air/fuel mixture is drawn through the intake port and into the combustion chamber from the intake passage. Furthermore, when the internal combustion engine is operating at high speeds, the speed of the air/fuel mixture entering the combustion chamber generates a significant amount of momentum. However, if the intake valve were instead timed to close when the piston reaches bottom dead center, the momentum of the air/fuel mixture remaining in the intake passage would be sacrificed. In fact, an appreciable amount of the air/fuel mixture would be prevented from entering the combustion chamber. Therefore, even though the piston is beginning the compression stroke, the later closing of the intake valve allows the above-described momentum to "carry" the air/fuel mixture remaining in the intake passage into the combustion chamber. Consequently, when the internal combustion engine is operating at high speeds, the earlier opening and later closing of the intake valve allows a maximum amount of air/fuel mixture to enter the combustion chamber.

However, at low speeds, the earlier opening and later closing of the intake valve are undesirable. For example, as discussed hereinabove, when the intake valve is opened before the piston reaches top dead center, the intake valve and the exhaust valve are both in the open position. But, when the internal combustion engine is operating at low speeds, the siphoning-effect during such overlap is relatively weak, and the air/fuel mixture is not drawn into the combustion chamber by the exiting exhaust gases. In fact, because the air/fuel mixture is not drawn into the combustion chamber before the piston reaches top dead center, the exhaust gases will instead be forced through the intake port and into the intake passage. These exhaust gases dilute the air/fuel mixture in the intake passage, and therefore, effectively decrease the amount of air/fuel mixture drawn into the combustion chamber.

In addition, when operating at low speeds, the later closing of the intake valve is also undesirable. As discussed hereinabove, when the internal combustion engine is operating at high speeds, the later closing of the intake valve allows momentum to carry the air/fuel mixture remaining in the intake passage through the intake port and into the combustion chamber. However, at low speeds, the air/fuel mixture does not have enough speed to generate the momentum necessary to carry the air/fuel mixture remaining in the intake passage into the combustion chamber. In fact, at low speeds, when the piston reaches position bottom dead center, the movement of the air/fuel mixture through the intake port effectively stops. Because the intake valve remains open when the piston is beginning the compression stroke, the piston forces an appreciable amount of air/fuel mixture in the combustion chamber back through the intake port, and therefore, effectively decreases the amount of air/fuel mixture drawn into and trapped in the combustion chamber.

Therefore, at low speeds, the earlier opening and later closing of the intake valve decreases amount of air/fuel mixture drawn into the combustion chamber. The net effect of this decrease is a reduction of the compression ratio of the internal combustion engine, and a decrease in the of amount torque of the internal combustion engine can produce at low speeds.

The amount of power produced by the internal combustion engine is determined by multiplying the speed of the internal combustion engine (measured in revolutions per minute, or R.P.M.) by the amount of torque the internal combustion engine can produce at that speed. Therefore, when compared to the amount of power produced by an internal combustion engine operating at low speeds where the intake valve opens at top dead center and closes at bottom dead center, the speed of the above-described internal combustion engine must be increased to produce the same amount of power. An increase in speed also increases of the amount of air/fuel mixture, and, therefore increases the fuel that must be consumed.

Because the timing of the piston and the intake valve is synchronized according to the combustion cycle, but not to the speed of the internal combustion engine, to accommodate variable speeds of internal combustion engines, compromises are necessarily made in the timing. For example, to accommodate high speeds, the intake valve can be timed to open significantly before the piston reaches top dead center and close significantly after the piston reaches bottom dead center. Furthermore, to accommodate low speeds, the cam shaft can be configured to provide for the rapid opening and closing of the intake valve in an attempt to minimize the above-discussed undesirable effects of the earlier opening and later closing of the intake valve. However, the rapid opening and closing of the intake valve increases the stress on the operation of the intake valve operating components, and thereby decreases the reliability of the internal combustion engine.

As a result, there is a need for an internal combustion engine where the above-discussed undesirable effects of the earlier opening and the later closing of the intake valve can be eliminated at low speeds without the need for the rapid opening and closing of the intake valve, and the associated increase of stress on the intake valve operating components.

SUMMARY OF THE INVENTION

An auxiliary valve positioned in an intake passageway of a four-cycle internal combustion engine is provided for controlling the flow of air/fuel mixture into a combustion chamber, comprising: a through passage, the through passage defined by a top wall, a bottom wall, and opposing side walls; a swingable door openable and closable in relation to the through passage; and a spring loaded assembly biasing the swingable door closed.

A preferred exemplary auxiliary valve according to the concepts of the present invention is shown by way of example in the accompanying drawings without attempting to show all the various forms and modifications in which the invention might be embodied, the invention being measured by the appended claims and not by the details of the specification.

DETAILED DESCRIPTION OF THE INVENTION

Figure 1:
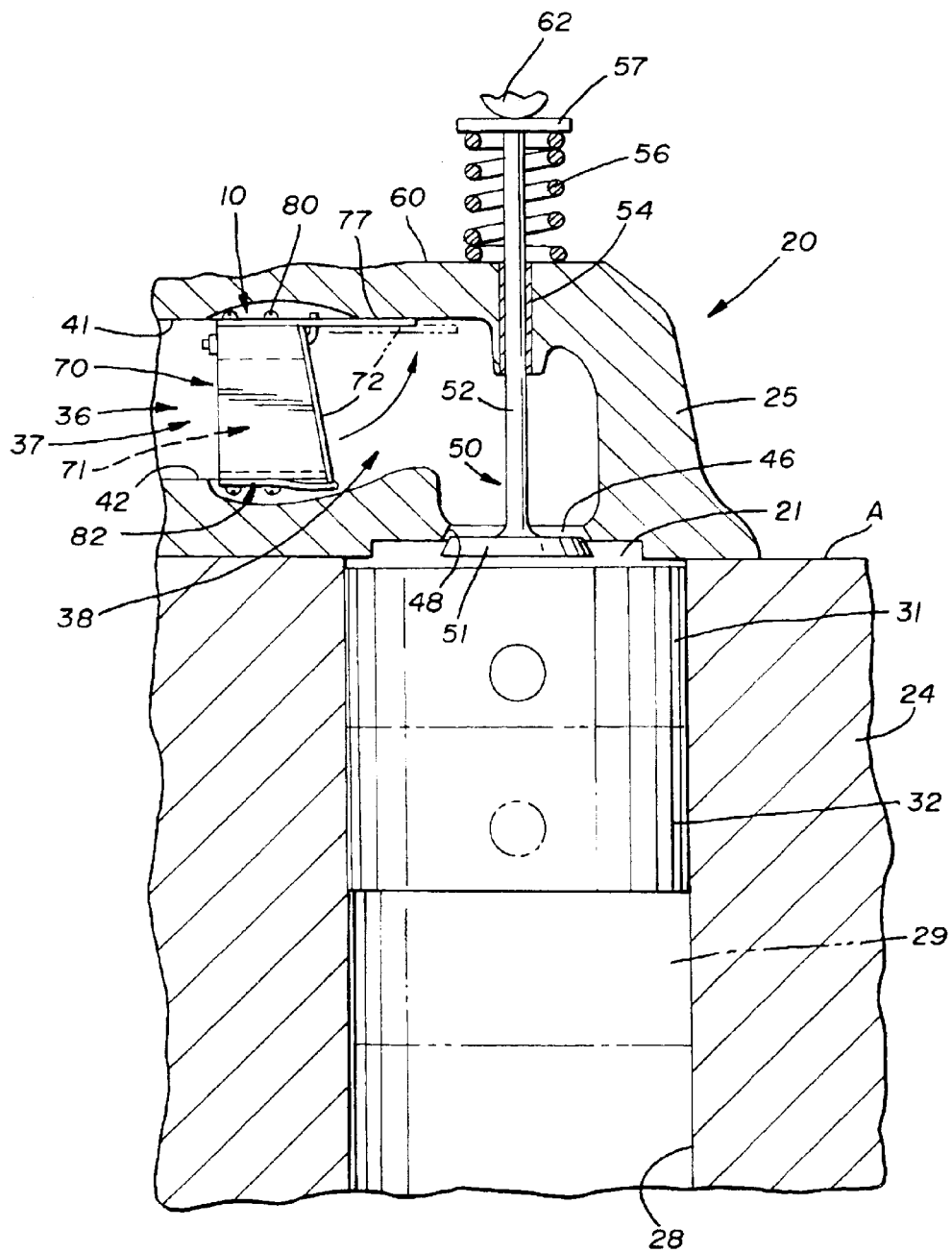
FIG. 1 is a partial cross-sectional view of an internal combustion engine, having an auxiliary valve made in accordance with the present invention, and positioned within the internal combustion engine.
Figure 2:
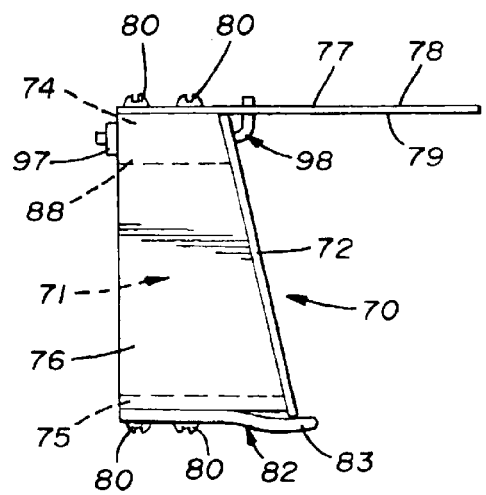
FIG. 2 is a side elevational view of the auxiliary valve with the swingable door in the closed position.
Figure 3:
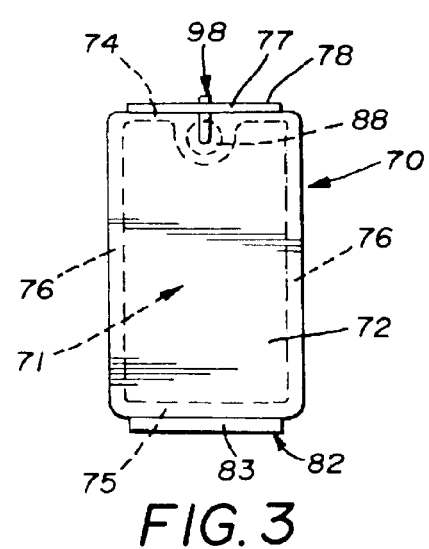
FIG. 3 is a front elevational view of the auxiliary valve with the swingable door in the closed position.
Figure 4:
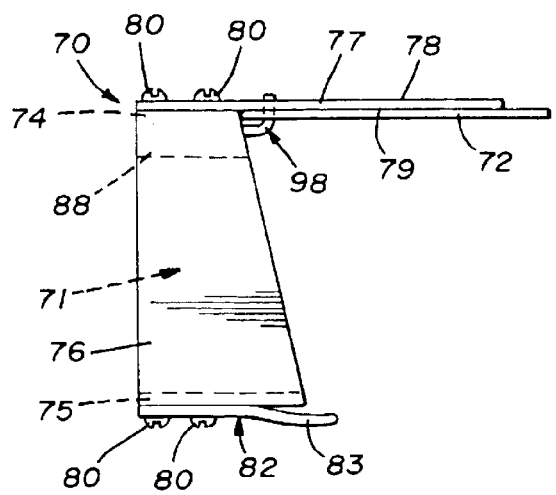
FIG. 4 is a side elevational view of the auxiliary valve with the swingable door in the open position.
Figure 5:
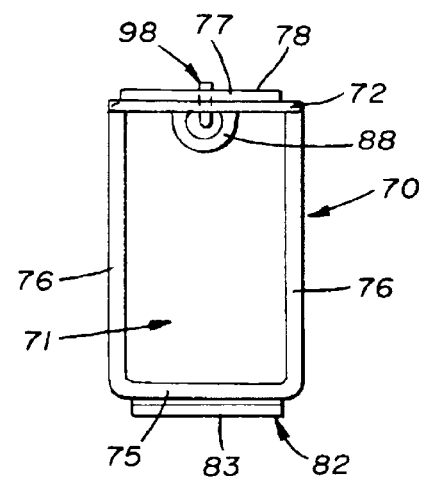
FIG. 5 is a front elevational view of the auxiliary valve with the swingable door in the open position.

The auxiliary valve of the present invention is generally indicated by the numeral 10 in FIGS. 1–6. With reference to FIG. 1, the auxiliary valve 10 is positioned within a four-stroke internal combustion engine 20, and is configured to enhance the flow of the air/fuel mixture to the combustion chamber 21. The engine 20 includes an engine block 24 and cylinder head 25 which are aligned along a plane A with at least one combustion chamber 21 being formed therebetween.

The engine block 24 includes at least one cylinder 28 (companioned with a combustion chamber 21) defining a space where a piston 29 attached to a crankshaft (not shown) reciprocates. The reciprocation of piston 29 within the cylinder 28 according to the above-described combustion cycle generates the output of the engine 20. To facilitate reciprocation of the piston 29, the engine 20 follows a combustion cycle with four strokes of operation. That is, the combustion cycle of the engine 20, includes intake, compression, combustion, and exhaust strokes. During each of these strokes, the piston travels between a first position 31 (at top dead center) and a second position 32 (at bottom dead center), and such movement generates the output of the engine 20.

As seen in FIG. 1, the cylinder head 25 includes an intake passage 36 divided by the auxiliary valve 10 into an upstream portion 37 and a downstream portion 38. The intake passage 36 has an upper surface 41 and a lower surface 42. The intake passage 36 communicates with an intake port 46 through which the air/fuel mixture enters the combustion chamber 21. The intake port 46 includes a valve seat 48 for providing a seal between the intake port 46 and an intake valve 50. The intake valve 50 includes a valve head 51 and valve stem 52. The intake valve 50 is supported by a bushing 54 provided in an aperture in the cylinder head 25. The valve stem 52 is slidable within the bushing 54, and therefore, the intake valve 50 is moveable from an open position and a closed position.

In the closed position, the valve head 51 engages the valve seat 48, and cuts off the combustion chamber 21 from the intake passage 36. Furthermore, a spring 56 is used to bias the intake valve 50 in the closed position. For example, the valve stem 52 is attached to a spring boss 57, and the spring 56 extends between the upper surface 60 of the cylinder head 25 and the spring boss 57. The force provided by the spring 56 is used to close the valve 50. During operation of the engine 20, a camshaft, a portion of which is indicated by the numeral 62, interacts with the spring boss to provide for the opening and closing of the intake valve 50.

As discussed hereinabove, the engine 20 has four strokes of operation. In association with the intake stroke, the intake valve 50 is timed to open and close, and the piston 29 is timed to move from the first position 31 to the second position 32. Together, the intake valve 50 and the piston 29 are synchronized to allow the air/fuel mixture to be drawn into the combustion chamber 21. For example, provided the intake valve 50 is open, the movement of the piston 29 from the first position 31 to the second position 32 creates suction to draw the air/fuel mixture into the combustion chamber 21.

However, if the engine 20 is operating at low speeds, the intake valve 50 would ideally be opened when the piston 29 is at the first position 31 and closed when the piston is at the second position 32. Furthermore, if the engine 20 is operating at high speeds, the intake valve 50 would ideally be opened before the piston 29 reaches the first position 31 and closed after the piston 29 reaches the second position 32. At both low and high speeds, the ideal movements of the intake valve 50 allows a maximum amount of air/fuel mixture to enter the combustion chamber 21. However, as discussed hereinabove, to accommodate variable speeds of engine 20, compromises are made in the timing. Therefore, the intake valve 50 is opened before the piston reaches position 31 and closed after the piston reaches position 32.

To overcome the above-discussed undesirable effects of the earlier opening and later closing of the intake valve 50, when the engine 20 is operating at low speeds, the auxiliary valve 10 can be positioned in the intake passage 36. As discussed hereinabove, and as seen in FIG. 1, the auxiliary valve 10 is positioned in the intake passage 36, and divides the intake passage 36 into the upstream portion 37 and the downstream portion 38. As seen in FIGS. 1–6, the auxiliary valve 10 includes a rectangular through passage 71 and a swingable door 72 opening and closing in relation to the rectangular through passage 71. The rectangular through passage 71 is formed by a top wall 74, a bottom wall 75, and opposing side walls 76. In fact, on the side of the auxiliary valve 10 adjacent the downstream position 38, the top wall 74, the bottom wall 75, and opposing side walls 76 act as a valve seat, and function to isolate one side of the auxiliary valve 10 from the other when the swingable door 72 is closed. Ideally, the auxiliary valve 10 is sealed around its exterior surfaces. As such, the air/fuel mixture is required to pass through the rectangular through passage 71 to travel from the upstream portion 37 to the downstream portion 38.

An attachment bracket 77 is secured to the top wall 74 via fasteners 80. The attachment bracket 77 includes an upper surface 78 and lower surface 79. The attachment bracket 77 can be secured to the upper surface 41 to fixedly position the auxiliary valve 10 inside the intake passage 36. For example, the attachment bracket 77 can be clamped in position using a bracket (not shown), or the attachment bracket 77 can be bolted to the upper surface 41.

A bracket 82 having a lip 83 is secured to the bottom wall 75 via fasteners 80. When the swingable door 72 is in the closed position, the lip 83 catches the swingable door 72, and thereby functions to slightly retard the opening thereof. Furthermore, the lip 83 is curved, and facilitates the gentle closing of the swingle door 72. For example, as the swingable door 72 closes, the swingable door 72 contacts the lip 83 first, and thereafter the concavity of lip 83 guides the swingable door 83 into the closed position. As such, the lip 83 cushions the closing movement of the swingable door 72.

Figure 6:
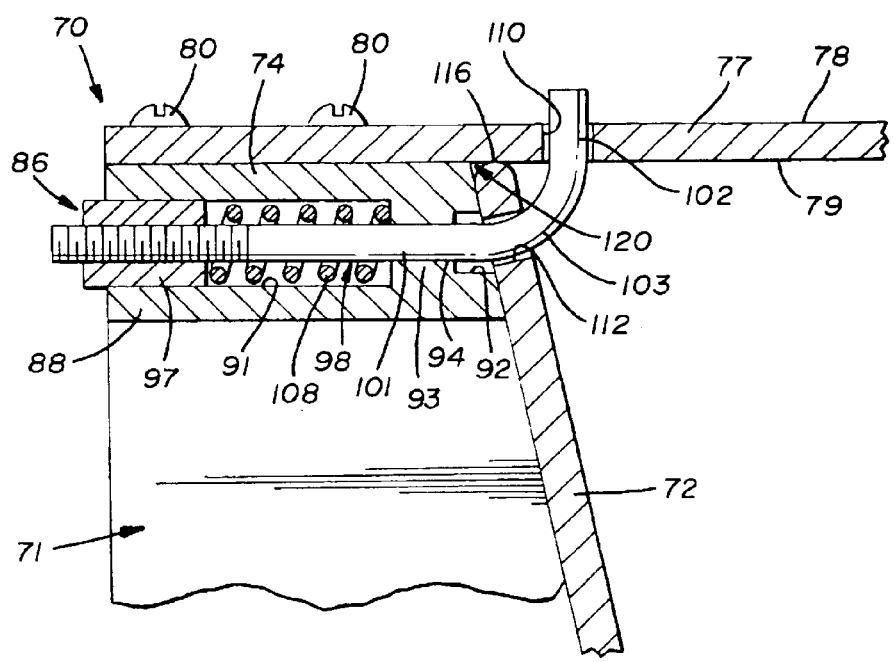
FIG. 6 is sectional view showing a spring-loaded assembly of the auxiliary valve with the swingable door in the closed position.

As shown in FIG. 6, a spring loaded assembly 86 is provided in the rectangular through passage 71 and extends along the top wall 74. The spring-loaded assembly 86 provides for pivotal movement of the swingable door 72, but, at the same time, biases the swingable door 72 in the closed position. The spring loaded assembly includes a boss 88 integral with the top wall 74 having a first cylindrical aperture 91 and a second cylindrical aperture 92 therethrough, and a divider 93 located between the apertures 91 and 92. A bushing-like hole 94 is provided through the divider 93, and extends from the first cylindrical aperture 91 to the second cylindrical aperture 92.

The first cylindrical aperture 91 is adapted to accommodate a plug 97, with the second cylindrical aperture 92, and the bushing-like hole 94 being adapted to accommodate portions of a hook-shaped latching member 98. The hook-shaped latching member 98 includes a horizontal portion 101, a vertical portion 102, and a curved portion 103 joining the horizontal portion 101 and vertical portion 102.

The plug 97 is attached to the hook-shaped latching member 98 via a threaded interface with the horizontal portion 101. Together, the plug 97 and portions of the hook-shaped latching member 98 are capable of axial movement within the boss 88. To that end, the plug 97 is slidably supported by the first cylindrical aperture 91. Like the plug 97, the horizontal portion 101 is slidably supported by the bushing-like hole 94. As discussed hereinbelow, the movement of the plug 97 and portions of the hook-shaped latching member 98 within the boss 88 provides for the movement of the swingable door 72 between the opened position and the closed position.

A spring 108 is provided around the horizontal portion 101, and extends from the divider 93 to interface with the plug 97. The spring 108 forces the plug 97 away from the divider 93, and, therefore, biases the hook-shaped latching member 98 to the left (as seen in FIG. 6). The vertical portion 102 extends through an aperture 110 in the attachment bracket 77, and the curved portion 103 extends though a door aperture 112 in the swingable door 72.

The swingable door 72 also includes a rounded upper edge surface 116 that provides for pivotal movement of the swingable door 72. The rounded upper edge surface 116 allows the swingable door 72 to pivot in a corner 120 formed by an exterior surface of the top wall 74 and the bottom surface 79 of the attachment bracket 77.

The shape of the hook-shaped latching member 98, and the bias of the hook-shaped latching member 98 to the left functions to bias the swingable door 72 in the closed position. For example, because of the bias of the hook-shaped latching member 98 to the left in FIG. 6, the curved portion 103 and the door aperture 112 interact. The bias causes the curved portion 103 to "pull" against an upper part of the door aperture 112, and, due to the pivotal movement allowed by the rounded upper edge surface 116, biases the swingable door 72 in the closed position.

During operation of the internal combustion engine 20, the bias of the spring 108 can be overcome by the suction provided by the downward movement of the piston 29. For example, as the suction provided by downward movement of the piston 29 increases, the swingable door 72 moves away from the closed position. The movement of the swingable door 72 causes the upper part of the door aperture 112 to "push" against the curved portion 103. If there is enough suction provided by the piston 29, then the swingable door 72 can pivot in the corner 120 between the closed position and the opened position, and simultaneously force the hook-shaped latching member 98 in the right-hand direction.

During movement of the swingable door 72, the bias of the hook-shape latching member 98, and the interaction between the curved portion 103 and the door aperture 112 constrains the movement of the swingable door 72 to a predetermined path. For example, the interaction between the curved portion 103 and the door aperture 112 "straps" the rounded upper edge surface 116 into the corner 120. Therefore, as the curved portion 103 and the door aperture 112 interact, the position of the rounded edge surface 116 is maintained in the corner 120. Furthermore, because the curved portion 103 extends though the door aperture 112, the swingable door 72 must follow the predetermined path defined by the curvature of the curved portion 103 to pivot. That is, as the swingable door 72 pivots between the opened position and closed position, the swingable door 72 must travel along the curvature of the curved portion 103. In fact, because the interaction between the curved portion 103 and the door aperture 112 maintains the rounded upper edge surface in position, and the swingable door 72 must travel along the curvature of the curved portion 103, the spring-loaded assembly 86 acts as a spring-biased hinge.

The operation of the auxiliary valve 10 overcomes the undesirable effects caused by the earlier opening and later closing of the intake valve 50 in association with the intake stroke, when the internal combustion engine 20 is operating at low speeds. In fact, at low speeds of engine 20, the auxiliary valve 10 is designed to prevent communication between the intake passage 36 and combustion chamber 21 independently of the intake valve 50 before the piston 29 reaches top dead center and after the piston 29 reaches bottom dead center.

As discussed hereinabove, the swingable door 72 of the auxiliary valve 10 is biased by the spring-load assembly 86 in the closed position. The bias of the swingable door 72 can be overcome when the pressure in the combustion chamber 21 is lower than the pressure upstream of auxiliary valve 10. However, when the internal combustion engine 20 is operating at low speeds, the bias can only be overcome by the suctioning provided by the downward movement of the piston 29. Therefore, even though the intake valve 50 is opened before the intake stroke begins, the auxiliary valve 10 remains closed, and there is no communication between the intake passage 36 upstream of the auxiliary valve 10 and combustion chamber 21 before the piston 29 reaches top dead center, and thereafter begins moving downwardly. As a result, because the auxiliary valve 10 remains closed, the piston 29 cannot force exhaust gases through the rectangular through passage 71, when the engine 20 is operating at low speeds, and the intake valve 50 is opened before the intake stroke begins.

Furthermore, even though the intake valve 50 remains open after the intake stroke ends, the auxiliary valve 10 is closed, and there is no communication between the intake passage 36 upstream of the auxiliary valve 10 and the combustion chamber 21 after the piston 29 reaches bottom dead center, and thereafter begins moving upwardly. For example, after the intake stroke ends (and the compression stroke begins), the pressure in the combustion chamber 21 increases. The pressure increase allows the spring-loaded assembly 86 to move the swingable door 72 into the closed position. As a result, because the auxiliary valve 10 is closed, the piston 29 cannot force the air/fuel mixture drawn into the combustion chamber 21 back through the rectangular through passage 71, when the engine 20 is operating at low speeds, and the intake valve 50 remains open after the intake stroke ends.

However, interference by the auxiliary valve 10 with the high speed operation of the engine 20 is limited. For example, at high speeds of engine 20, there is overlap between the intake valve 50 and exhaust valve when the intake valve 50 is opened before the piston reaches top dead center to thereafter begin the intake stroke. As discussed hereinabove, such overlap creates a siphoning-effect. The siphoning-effect is capable of moving the swingable door 72 away from the closed position to allow the air/fuel mixture to enter the combustion chamber 21. As such, the air/fuel mixture is allowed to begin accelerating up to speed before the piston begins the intake stroke, and the swingable door 72 moves into the fully open position.

Furthermore, at high engine 20 speeds, the momentum of the air/fuel mixture entering the combustion chamber 21 keeps the swingable door 72 at least partially open until the intake valve 50 closes. For example, when the intake valve 50 remains open after the piston 29 begins moving upwardly during the compression stroke, the same momentum used to carry the air/fuel mixture into the combustion chamber 21 keeps the swingable door 72 at least partially open. As such, at high engine 20 speeds, the auxiliary valve 10 allows the air/fuel mixture to continue moving into the combustion chamber 21 after beginning the compression stroke, but before the intake valve 50 closes. Therefore, the auxiliary valve 10 allows the air/fuel mixture to enter the combustion chamber 21 when the intake valve 50 is open significantly before the piston 29 begins and significantly after the piston 39 ends the intake stroke as required when engine 20 is operating at high speeds, but at low engine 20 speeds, the auxiliary valve 10 also eliminates the undesirable effects caused by the earlier opening and later closing of the intake valve 50 in association with the intake stroke.

Thus, it should be evident that the AUXILIARY VALVE FOR THE INTAKE PASSAGEWAY OF AN INTERNAL COMBUSTION ENGINE disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

What is claimed is:

1. An auxiliary valve positioned in an intake passageway of a four-cycle internal combustion engine for controlling the flow of air/fuel mixture into a combustion chamber, comprising:

a through passage, said through passage defined by a top wall, a bottom wall, and opposing side walls;

a swingable door openable and closable in relation to said through passage; and a spring loaded assembly biasing said swingable door in a closed position, wherein, when the four-cycle internal combustion engine is operating at low speeds, the bias of said spring loaded assembly can be overcome to open said swingable door during the intake stroke of the four-cycle internal combustion engine.

2. An auxiliary valve according to claim 1, further comprising an attachment bracket secured to said top wall, said attachment bracket serving to secure the auxiliary valve inside the intake passageway.

3. An auxiliary valve positioned in an intake passageway of a four-cycle internal combustion engine for controlling the flow of air/fuel mixture into a combustion chamber, comprising:

a through passage, said through passage defined by a top wall, a bottom wall, and opposing side walls;

a swingable door openable and closable in relation to said through passage;

a spring loaded assembly biasing said swingable door closed; and a bracket secured to said bottom wall, said bracket having a lip configured to catch said swingable door in the closed position, and retard the opening of said swingable door.

4. An auxiliary valve according to claim 3, wherein said lip is curved to guide said swingable door into the closed position.

5. An auxiliary valve positioned in an intake passageway of a four-cycle internal combustion engine for controlling the flow of air/fuel mixture into a combustion chamber, comprising:

a through passage, said through passage defined by a top wall, a bottom wall, and opposing side walls;

a swingable door openable and closable in relation to said through passage; and a spring loaded assembly biasing said swingable door closed;

said spring loaded assembly including a boss and a latching member partially disposed within said boss, said latching member capable of movement in association with the opening and closing of said swingable door.

6. An auxiliary valve according to claim 5, wherein said latching member extends through a door aperture in said swingable door, and interaction between said latching member and said door aperture allows said swingable door to open and close.

7. An auxiliary valve according to claim 6, further comprising a plug attached to said latching member, wherein said plug is slidably supported by said boss, and said plug and said latching member are biased to close said swingable door.

8. An auxiliary valve according to claim 7, wherein said boss is located inside said through passage on said top wall, and includes a first aperture, a second aperture, a divider positioned between said first aperture and said second aperture, and a bushing-like hole in said divider, said latching member moving within said first aperture, said second aperture, and said bushing-like hole.

9. An auxiliary valve according to claim 8, further comprising a spring positioned around said latching member, and extending from said divider to interface with said plug, said spring biasing said plug away from said divider.

10. An auxiliary valve according to claim 9, wherein said swingable door has a rounded upper edge surface allowing said swingable door to pivot.

11. An auxiliary valve according to claim 10, wherein said latching member is hook shaped, and includes a horizontal portion, a vertical portion, and a curved portion extending between said horizontal portion and said vertical portion, said curved portion interacting with said door aperture according to the bias of said spring and the cycles of operation of said four-cycle internal combustion engine.

12. An auxiliary valve according to claim 11, wherein, when said four-cycle internal combustion engine is operating at low speeds, the bias of said spring is overcome and said swingable door opens after the intake stroke begins.

13. An auxiliary valve according to claim 11, wherein, when said four-cycle internal combustion engine is operating at low speeds, the bias of said spring closes said swingable door after the intake stoke ends.

* * * * *